(12) United States Patent
Tak

(10) Patent No.: US 12,229,597 B2
(45) Date of Patent: Feb. 18, 2025

(54) ELECTRONIC DEVICE AND METHOD FOR CONTROLLING ELECTRONIC DEVICE

(71) Applicant: SAMSUNG ELECTRONICS CO., LTD., Suwon-si (KR)

(72) Inventor: Hyunuk Tak, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 834 days.

(21) Appl. No.: 17/426,439

(22) PCT Filed: Nov. 26, 2019

(86) PCT No.: PCT/KR2019/016311
§ 371 (c)(1),
(2) Date: Jul. 28, 2021

(87) PCT Pub. No.: WO2020/159055
PCT Pub. Date: Aug. 6, 2020

(65) Prior Publication Data
US 2022/0107841 A1    Apr. 7, 2022

(30) Foreign Application Priority Data
Jan. 28, 2019 (KR) .................. 10-2019-0010323

(51) Int. Cl.
G06F 9/50 (2006.01)
G06F 9/455 (2018.01)

(52) U.S. Cl.
CPC ........ *G06F 9/5027* (2013.01); *G06F 9/45558* (2013.01)

(58) Field of Classification Search
None
See application file for complete search history.

(56) References Cited

U.S. PATENT DOCUMENTS

| | | |
|---|---|---|
| 7,334,076 B2 | 2/2008 | Hendel et al. |
| 8,161,479 B2 * | 4/2012 | Sedukhin ............ G06F 9/45558 718/1 |

(Continued)

FOREIGN PATENT DOCUMENTS

| | | |
|---|---|---|
| JP | 2006-268123 A | 10/2006 |
| JP | 2014-235637 A | 12/2014 |

(Continued)

OTHER PUBLICATIONS

Office Action dated Jun. 22, 2023 in European Patent Application No. 19 912 674.9.

(Continued)

*Primary Examiner* — Hiren P Patel
(74) *Attorney, Agent, or Firm* — STAAS & HALSEY LLP

(57) ABSTRACT

An electronic device and a method for controlling the electronic device where a plurality of program areas corresponding to a host operating system and a plurality of virtual machines and a shared area corresponding to the host operating system and the plurality of virtual machines are allocated to a memory of the electronic device; and based on a request to install, in a second area among the plurality of program areas, a second application program corresponding to a first application program stored in a first area among the plurality of program areas, at least a part of data relating to the first application program is transferred from the first area to the shared area.

13 Claims, 15 Drawing Sheets

(56) References Cited

U.S. PATENT DOCUMENTS

| | | | | |
|---|---|---|---|---|
| 8,402,529 B1* | 3/2013 | Green | ................. | H04L 63/1416 |
| | | | | 726/11 |
| 8,806,479 B2* | 8/2014 | Alpern | ................ | G06F 9/45558 |
| | | | | 718/1 |
| 9,286,102 B1* | 3/2016 | Harel | ................... | G06F 11/1402 |
| 9,311,250 B2* | 4/2016 | Van De Ven | ......... | G06F 12/109 |
| 9,501,394 B2 | 11/2016 | Kohl et al. | | |
| 10,466,991 B1* | 11/2019 | Hussain | .................... | G06F 8/65 |
| 10,698,712 B2* | 6/2020 | Reddy | .................... | G06F 16/24 |
| 11,418,555 B1* | 8/2022 | Cafaro | ................. | H04L 65/612 |
| 2006/0206658 A1 | 9/2006 | Hendel et al. | | |
| 2010/0217916 A1* | 8/2010 | Gao | ...................... | G06F 12/109 |
| | | | | 718/1 |
| 2012/0216185 A1 | 8/2012 | Dai et al. | | |
| 2013/0159596 A1 | 6/2013 | Van De Ven et al. | | |
| 2015/0186129 A1* | 7/2015 | Apte | ................... | G06F 9/44505 |
| | | | | 717/174 |
| 2015/0347173 A1* | 12/2015 | Shen | ..................... | G06F 9/5077 |
| | | | | 718/1 |
| 2016/0048464 A1 | 2/2016 | Nakajima et al. | | |
| 2016/0098285 A1* | 4/2016 | Davis | ................. | G06F 9/45545 |
| | | | | 718/1 |
| 2016/0188312 A1* | 6/2016 | Shi | ............................ | G06F 8/62 |
| | | | | 717/176 |
| 2017/0364380 A1* | 12/2017 | Frye, Jr. | ..................... | G06F 8/65 |
| 2017/0364394 A1* | 12/2017 | Fujita | .................... | G06F 9/5088 |
| 2020/0065016 A1 | 2/2020 | Jiang et al. | | |
| 2020/0192694 A1 | 6/2020 | Ishiko et al. | | |
| 2022/0318098 A1* | 10/2022 | Batraev | ............... | G06F 11/1464 |

FOREIGN PATENT DOCUMENTS

| | | |
|---|---|---|
| KR | 2002-0078749 A | 10/2002 |
| KR | 10-2006-0099404 A | 9/2006 |
| KR | 10-2013-0070501 | 6/2013 |
| KR | 10-2014-0092493 A | 7/2014 |
| KR | 10-2015-0078286 A | 7/2015 |
| KR | 10-1729097 B1 | 4/2017 |
| KR | 10-1841847 B1 | 5/2018 |
| KR | 10-2020-0021867 A | 3/2020 |

OTHER PUBLICATIONS

Office Action dated Jan. 23, 2024 in Korean Patent Application No. 10-2019-0010323.
Extended European Search Report dated Feb. 11, 2022 in European Patent Application No. 19912674.9 (8 pages).
International Search Report, dated Mar. 17, 2020, in International Application No. PCT/KR2019/016311.
Written Opinion of the International Searching Authority, Form PCT/ISA/237, in International Application No. PCT/KR2019/016311.

* cited by examiner

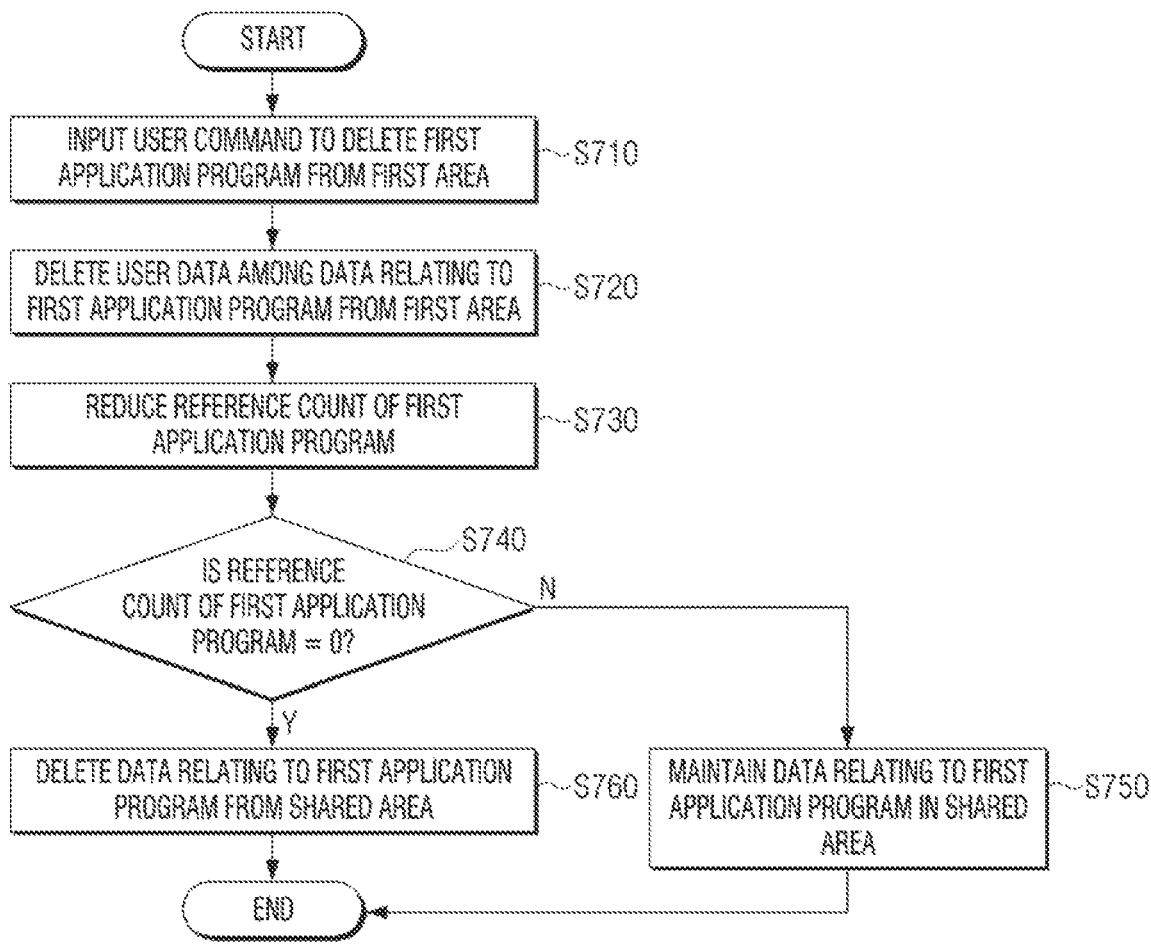

ELECTRONIC DEVICE AND METHOD FOR CONTROLLING ELECTRONIC DEVICE

CROSS-REFERENCE TO RELATED APPLICATION

This application is a U.S. National Stage Application, which claims the benefit under 35 U.S.C. § 371 of International Patent Application No. PCT/KR2019/016311, filed on Nov. 26, 2019, which claims the priority benefit of Korean Patent Application No. 10-2019-0010323, filed on Jan. 28, 2019 in the Korean Patent and Trademark Office, the disclosures of which are hereby incorporated by reference in their entirety.

BACKGROUND

Field

This disclosure relates to an electronic device and a method for controlling thereof and, more particularly to, a method of efficiently managing a memory in an electronic device in which a virtualization system including a plurality of virtual machines are implemented.

Description of the Related Art

Virtualization refers to one of technologies that gains attention as cloud computing through the Internet and a smartphone have been spread and a technology that may provide various computing environments under limited physical systems.

Since a plurality of virtual machines implemented on a virtualization system share limited computing resources, there is a necessity for a technology capable of preventing unnecessary waste of resources between virtual machines.

Specifically, if the same data exists in each area allocated to the plurality of virtual machines in a duplicate manner, inefficient use of the memory may be caused. Such inefficiency may be more pronounced when a game or tool-related program requiring graphic data is installed in each of the plurality of virtual machines.

Therefore, in an electronic device in which a virtualization system including a plurality of virtual machines are implemented, there is a need for a technology which may efficiently manage a memory.

It is an object of the disclosure to provide a method of efficiently managing a memory in an electronic device in which a virtual system including a plurality of virtual machines are included.

SUMMARY

According to an embodiment, an electronic device includes a memory comprising at least one instruction and a processor connected to the memory configured to control the electronic device.

The processor may allocate a plurality of program areas corresponding to a host operating system and each of a plurality of virtual machines and a shared area corresponding to the host operating system and the plurality of virtual machines to the memory, and based on a user command for installing, in a second area among the plurality of program areas, a second application program corresponding to a first application program stored in a first area among the plurality of program areas, being input, transfer at least a part of data relating to the first application program from the first area to the shared area.

The shared area may include a first shared area corresponding to the host operating system and a second shared area corresponding to the plurality of virtual machines, and the processor may, based on receiving a user command for installing, in a program area corresponding to a second virtual machine among the plurality of program areas, a second application program corresponding to the first application program stored in a program area corresponding to a first virtual machine among the plurality of program areas, transfer at least a part of the data relating to the first application program from a program area corresponding to the first virtual machine to the second shared area.

The shared area may include a first shared area corresponding to the host operating system and a second shared area corresponding to the plurality of virtual machines, and the processor may, based on a user command for installing, in a program area corresponding to a second virtual machine among the plurality of program areas, a second application program corresponding to the first application program stored in a program area corresponding to a host operating system among the plurality of programs areas, being input, transfer at least a part of the data relating to the first application program from a program area corresponding to the host operating system to the first shared area.

The processor may, based on a user command for installing, in a second area among the plurality of program areas, a second application program corresponding to the first application program stored in a first area among the plurality of program areas, being input, maintain data relating to a user among the data relating to the first application program in the first area and transfer data other than the user data among the data relating to the first application program from the first area to the shared area.

The processor may, based on at least a part of the data relating to the first application program being transferred to the shared area, increase a reference count relating to a number of times when the data relating to the first application program is transferred from the plurality of program areas to the shared area and a number of times when the user data among the data relating to the first application program is deleted from the plurality of program areas.

The processor may, based on a user command to delete the first application program from the first area being input, delete the user data from the first area, and based on the user data being deleted, reduce the reference count.

The processor may, based on a user command to delete the first application program from the first area being input, determine whether to delete the first application program based on the reference count.

The processor may, based on the reference count being greater than zero, maintain data relating to the first application program in the shared area, and based on the reference count being zero, delete the data relating to the first application program from the shared area.

According to an embodiment, a method for controlling an electronic device includes allocating a plurality of program areas corresponding to a host operating system and each of a plurality of virtual machines and a shared area corresponding to the host operating system and the plurality of virtual machines to a memory included in the electronic device; and based on a user command for installing, in a second area among the plurality of program areas, a second application program corresponding to a first application program stored in a first area among the plurality of program areas, being input, transferring at least a part of data relating to the first application program from the first area to the shared area.

The shared area may include a first shared area corresponding to the host operating system and a second shared area corresponding to the plurality of virtual machines, and, the transferring may include, based on receiving a user command for installing, in a program area corresponding to a second virtual machine among the plurality of program areas, a second application program corresponding to the first application program stored in a program area corresponding to a first virtual machine among the plurality of program areas, transferring at least a part of the data relating to the first application program from a program area corresponding to the first virtual machine to the second shared area.

The shared area may include a first shared area corresponding to the host operating system and a second shared area corresponding to the plurality of virtual machines, and the transferring may include, based on a user command for installing, in a program area corresponding to a second virtual machine among the plurality of program areas, a second application program corresponding to the first application program stored in a program area corresponding to a host operating system among the plurality of programs areas, being input, transferring at least a part of the data relating to the first application program from a program area corresponding to the host operating system to the first shared area.

The transferring may include, based on a user command for installing, in a second area among the plurality of program areas, a second application program corresponding to the first application program stored in a first area among the plurality of program areas, being input, maintaining data relating to a user among the data relating to the first application program in the first area and transferring data other than the user data among the data relating to the first application program from the first area to the shared area.

The method may further include, based on at least a part of the data relating to the first application program being transferred to the shared area, increasing a reference count relating to a number of times when the data relating to the first application program is transferred from the plurality of program areas to the shared area and a number of times when the user data among the data relating to the first application program is deleted from the plurality of program areas.

The method may further include, based on a user command to delete the first application program from the first area being input, deleting the user data from the first area, and based on the user data being deleted, reducing the reference count.

The method may further include, based on a user command to delete the first application program from the first area being input, determining whether to delete the first application program based on the reference count.

The method may further include, based on the reference count being greater than zero, maintaining data relating to the first application program in the shared area, and based on the reference count being zero, deleting the data relating to the first application program from the shared area.

A computer-readable recording medium including a program for executing a method for controlling an electronic device, the method includes allocating a plurality of program areas corresponding to a host operating system and each of a plurality of virtual machines and a shared area corresponding to the host operating system and the plurality of virtual machines to a memory included in the electronic device; and based on a user command for installing, in a second area among the plurality of program areas, a second application program corresponding to a first application program stored in a first area among the plurality of program areas, being input, transferring at least a part of data relating to the first application program from the first area to the shared area.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 7 is a flowchart illustrating a process in which at least a part of data relating to an application program transferred from a program area to a shared area is deleted from a shared area, according to an embodiment;

DETAILED DESCRIPTION

Figure 1:
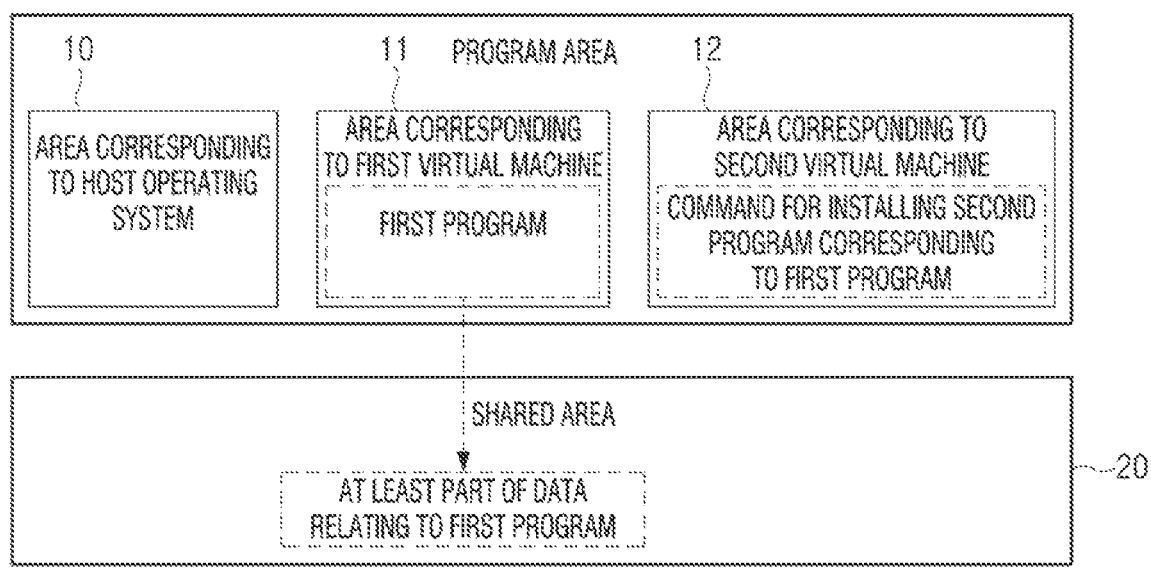
FIG. 1 is a diagram schematically illustrating a process of controlling an electronic device according to an embodiment.

The present embodiments may apply various modifications and may have various embodiments, and the embodiments will be described in detail in the detailed description with reference to the accompanying drawings. However, it may be understood that the disclosure is not limited to the embodiments described hereinafter, but also includes various modifications, equivalents, and/or alternatives of these embodiments. In relation to explanation of the drawings, similar drawing reference numerals may be used for similar constituent elements.

In describing the disclosure, a detailed description of known functions or configurations incorporated herein will be omitted when it may obscure the subject matter of the disclosure.

In addition, the following embodiments may be modified in many different forms, and the scope of the technical spirit of the disclosure is not limited to the following examples. Rather, these embodiments are provided so that this disclosure will be thorough and complete, and will fully convey the technical spirit to those skilled in the art.

The terms used herein are to describe certain embodiments and are not intended to limit the scope of claims. A singular expression includes a plural expression unless otherwise specified.

In this specification, expressions such as "have," "may have," "include," "may include" or the like represent presence of a corresponding feature (for example, components such as numbers, functions, operations, or parts) and does not exclude the presence of additional feature.

In this document, expressions such as "at least one of A [and/or] B," or "one or more of A [and/or] B," include all possible combinations of the listed items. For example, "at least one of A and B," or "at least one of A or B" includes any of (1) at least one A, (2) at least one B, or (3) at least one A and at least one B.

As used herein, the terms "first," "second," or the like may denote various components, regardless of order and/or importance, and may be used to distinguish one component from another, and does not otherwise limit the components.

If it is described that a certain element (e.g., first element) is "operatively or communicatively coupled with/to" or is "connected to" another element (e.g., second element), it should be understood that the certain element may be connected to the other element directly or through still another element (e.g., third element).

On the other hand, if it is described that a certain element (e.g., first element) is "directly coupled to" or "directly connected to" another element (e.g., second element), it may be understood that there is no element (e.g., third element) between the certain element and the another element.

It is understood that various elements and areas in the figures are shown out of scale. Accordingly, the scope of the disclosure is not limited by the relative sizes or spacing drawn from the accompanying drawings.

Hereinafter, with reference to the attached drawings, embodiments will be described in detail so that those skilled in the art to which the disclosure belongs to can easily make and use the embodiments.

FIG. 1 is a diagram schematically illustrating a process of controlling an electronic device according to an embodiment.

An electronic device according to the disclosure may include a personal computer (PC), a smartphone, a tablet PC, a server, or the like. However, if within a range to implement a virtualization system including a plurality of virtual machines as described below and to achieve an objective of the disclosure, there is no particular limitation to a type of electronic device.

The electronic device according to an embodiment may implement a virtualization system including a plurality of virtual machines. The virtualization system according to the disclosure may include a physical hardware, a host operating system, a virtualization program, a plurality of virtual machines and a guest operating system.

The host operating system may provide a platform for executing various application programs as well as for managing physical hardware constituting the electronic device. The virtualization program may provide a hypervisor, which is a logical platform for simultaneously executing a plurality of operating systems in one hardware constituting the electronic device.

When a plurality of virtual machines are implemented on the host operating system through the virtualization program, each of the plurality of virtual machines may be allocated with some resources of the physical hardware that make up the electronic device. When a plurality of guest operating systems corresponding to each of the plurality of virtual machines are installed, the electronic device may execute various application programs on the plurality of virtual machines through the plurality of guest operating systems.

The plurality of virtual machines may be implemented such that the same guest operating system may be installed in the plurality of virtual machines so that different users may utilize the same guest operating system, or different guest operating systems may be installed so that the same user may utilize various guest operating systems.

As shown in FIG. 1, the virtualization system according to the disclosure includes a plurality of program areas 10, 11, 12 and a shared area 20. The plurality of program areas 10, 11, and 12 include a plurality of areas corresponding to the host operating system and the plurality of virtual machines, respectively, and the shared area 20 corresponds to the host operating system and the plurality of virtual machines.

When the virtualization system as described above is implemented, the electronic device may allocate a plurality of program areas 10, 11, 12 corresponding to the host operating system and the plurality of virtual machines, respectively, and the shared area 20 corresponding to the host operating system and the plurality of virtual machines to the physical hardware constituting the electronic device.

The electronic device may allocate the program area 10 corresponding to the host operating system, the program area 11 corresponding to the first virtual machine, and the program area 12 corresponding to the second virtual machine to the physical hardware constituting the electronic device. The electronic device may allocate the shared area 20 corresponding to both the host operating system and the plurality of virtual machines to physical hardware constituting the electronic device.

The physical hardware may mean a set of all physical hardware constituting the electronic device, but in particular, the plurality of program areas 10, 11, 12 and the shared area 20 according to the disclosure may mean an area allocated to a memory, among physical hardware constituting the electronic device.

When a user command for installing a second application program corresponding to the first application program stored in the first area 11 among the plurality of program areas 10, 11, 12 in a second area 12 among the plurality of program areas 10, 11, 12, is input while the virtualization system is implemented as described above, the electronic device may move at least a part of the data relating to the first application program from the first area 11 to the shared area 20.

The electronic device may receive a user command to install the second application program in the second area 12 among the plurality of program areas 10, 11, 12 through a second virtual machine among the plurality of virtual machines.

If the second application program to be installed by the user in the second area 12 corresponds to the first application program stored in the first area 11 among the plurality of program areas 10, 11, 12, the electronic device may move at least a part of the data relating to the first application program from the first area 11 to the shared area 20.

That the first application program corresponds to the second application program may include that the first application program is the same as the second application program, and that at least a part of the data relating to the first application program is the same as the data relating to the second application program.

A specific description of a case where the first application corresponds to the second application program will be described with reference to FIG. 2 below.

When at least a part of the data relating to the first application program is transferred from the first area 11 to the shared area 20, the electronic device may use data relating to the first application program transferred to the shared area 20 through the second virtual machine. Specifically, the electronic device may execute the first application program through the second virtual machine on the basis of the data relating to the first application program transferred to the shared area 20.

According to an embodiment of the disclosure as described above, in an electronic device in which a virtualization system including a plurality of virtual machines is implemented, application programs corresponding to each other may be prevented from being installed in a duplicated manner in a plurality of program areas corresponding to each of a plurality of virtual machines, thereby preventing unnecessary waste of resources.

Accordingly, the efficiency of memory usage may be maximized in an electronic device in which a virtualization system including a plurality of virtual machines is implemented, and the utilization of a plurality of virtual machines may be significantly improved.

Figure 2:
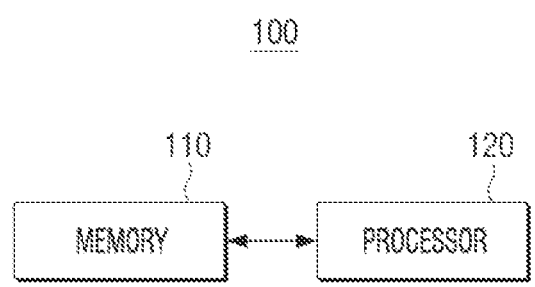
FIG. 2 is a block diagram schematically illustrating a configuration of an electronic device according to an embodiment.

FIG. 2 is a block diagram schematically illustrating a configuration of an electronic device according to an embodiment.

As illustrated in FIG. 2, the electronic device 100 according to an embodiment includes a memory 110 and a processor 120.

At least one instruction related to the electronic device 100 may be stored in the memory 110. In addition, an operating system (O/S) for driving the electronic device 100 may be stored in the memory 110. Various software programs or applications for operating the electronic device 100 may be stored in the memory 110 according to various embodiments of the disclosure. The memory 110 may include a semiconductor memory such as a flash memory or a magnetic storage medium such as a hard disk.

Various software modules for operating the electronic device 100 may be stored in the memory 110, and the processor 120 may execute various software modules stored in the memory 110 to control the operation of the electronic device 100.

According to various embodiments of the disclosure, the memory 110 may store software for a host operating system, a virtualization program, and a guest operating system, and the processor 120 may execute software stored in the memory 110 to implement a virtualization system including a plurality of virtual machines. In addition, an application program may be stored in the memory 110, and the processor 120 may execute an application program stored in the memory 110.

As described below, the memory 110 may be allocated with a plurality of program areas corresponding to the host operating system and the plurality of virtual machines, respectively, and a shared area corresponding to the host operating system and the plurality of virtual machines.

The processor 120 controls the overall operation of the electronic device 100. Specifically, the processor 120 is connected to the configuration of the electronic device 100 including the memory 110, and executes at least one instruction stored in the memory 110 as described above to generally control the operation of the electronic device 100.

The processor 120 may be implemented in various manners. For example, the processor 120 may be implemented as at least one of an application specific integrated circuit (ASIC), an embedded processor, a microprocessor, a hardware control logic, a hardware finite state machine (FSM), or a digital signal processor (DSP).

The processor 120 may include a read-only memory (ROM), random access memory (RAM), a graphic processing unit (GPU), and a central processing unit (CPU), and the ROM, RAM, GPU, CPU, or the like, may be interconnected through a bus.

According to various embodiments, a virtualization system including a plurality of virtual machines may be implemented by executing software stored in the memory 110. The virtualization system according to the disclosure may include a physical hardware, a host operating system, a virtualization program, a plurality of virtual machines and a guest operating system.

The host operating system may provide a platform for not only managing physical hardware constituting the electronic device 100 but also for executing various application programs. The virtualization program may provide a hypervisor, which is a logical platform for simultaneously executing a plurality of operating systems in one hardware constituting the electronic device 100.

When a plurality of virtual machines are implemented on the host operating system through the virtualization program, each of the plurality of virtual machines may be allocated with some resources of the physical hardware that constitute the electronic device 100. When a plurality of guest operating systems corresponding to each of the plurality of virtual machines are installed, the electronic device 100 may execute various application programs on the plurality of virtual machines through the plurality of guest operating systems.

The plurality of virtual machines may be implemented such that the same guest operating systems may be installed in the plurality of virtual machines so that different users may utilize the same guest operating system, and different guest operating systems may be installed so that the same user may utilize various guest operating systems.

The host operating system and the guest operating system according to the disclosure are not limited to a specific operating system. For example, when an electronic device according to the disclosure is implemented as a personal computer (PC), the host operating system and the guest operating system may be at least one of a Windows, a MAC OS, and Linux, respectively. In addition, when the electronic device according to the disclosure is implemented as a smartphone, the host operating system and the guest operating system may be at least one of Android, iOS, and Windows Mobile. When the electronic device according to the disclosure is implemented as a server, the host operating system and the guest operating system may be at least one of Linux, Unix, and Windows Server. In addition, the host operating system and the guest operating system according to the disclosure may be variously selected according to the type of the electronic device and the purpose of use of the user. As described above with respect to FIG. 1, the virtualization system according to the disclosure includes a plurality of program areas and a shared area. The plurality of program areas include a host operating system and a plurality of areas corresponding to each of the plurality of virtual machines, and the shared area corresponds to the host operating system and the plurality of virtual machines.

In other words, when the virtualization system is implemented as described above, the processor 120 may allocate a plurality of program areas corresponding to the host operating system and the plurality of virtual machines, respectively, and a shared area corresponding to the host operating system and the plurality of virtual machines to physical hardware constituting the electronic device 100, particularly to the memory 110.

The processor 120 may allocate a program area corresponding to the host operating system, a program area corresponding to the first virtual machine, and a program area corresponding to the second virtual machine to the memory 110. The processor 120 may allocate a shared area corresponding to both the host operating system and the plurality of virtual machines to the memory 110.

The processor 120 may control the overall process in which at least some of the data relating to the application program is transferred from the program area to the shared area, and at least a part of the data relating to the application program transferred from the program area to the shared area is deleted from the shared area based on the virtual system implemented as described above.

When a user command for installing a second application program corresponding to the first application program stored in the first area among the plurality of program areas is input to the second area of the plurality of program areas, the processor 120 may transfer at least a part of the data relating to the first application program from the first area to the shared area.

The processor 120 may receive a user command to install a second application program in a second area among the plurality of program areas through a second virtual machine among the plurality of virtual machines. Since the second area 12 is a program area corresponding to the second virtual machine, the user command for installing the application program in the second area 12 may be input through the second virtual machine.

It is a premise that a user command to install an application program in a plurality of program areas or to delete an application program from a plurality of programs is inputted through a virtual machine corresponding to a program area, and thus this will not be specifically mentioned below.

In this example, if the second application program to be installed in the second area corresponds to the first application program stored in the first area of the plurality of program areas, the processor 120 may transfer at least a part of the data relating to the first application program from the first area to the shared area.

That the first application program corresponds to the second application program may include a case where the first application program is the same as the second application program, and a case where at least a part of the data relating to the first application program is the same as the data relating to the second application program.

If a result as the same as the result of installing and executing the second application program in the second area may be obtained by using the data relating to first application program transferred to the shared area, the first application program and the second application program may be determined to correspond to each other.

For example, if a first guest operating system and a second guest operating system which are different types of guest operating systems are installed in the first virtual machine and the second virtual machine, respectively, and when the first application program supports the first guest operating system and the second application program supports the second guest operating system, it may be identified that the first application program stored in the first area corresponding to the first virtual machine and the second application program to be installed in the second area through the second virtual machine may not correspond to each other.

The first application program stored in the first area corresponding to the first virtual machine and the second application program to be installed in the second area through the second virtual machine may be identified to correspond to each other, if the first application program is in a cross-platform type to support both the first guest operating system and the second guest operating system, even if the first guest operating system and the second guest operating system, which are different types of guest operating systems, are installed in the first virtual machine and the second virtual machine, respectively.

Even if a first guest operating system and a second guest operating system, which are different types of guest operating systems, are installed in the first virtual machine and the second virtual machine, respectively, and the first application program supports the first guest operating system and the second application program supports the second guest operating system, when the first guest operating system and the second operating system have a kernel in common, it may be identified that the first application program stored in the first area corresponding to the first virtual machine and the second application program to be installed in the second area corresponding to the second virtual machine may be identified to correspond to each other.

For example, even if Android an Linux are installed in the first virtual machine and the second virtual machine as the first guest operating system and the second guest operating system, respectively, and if the first application program supports Android and the second application program supports Linux, Android and Linux have a kernel in common and thus, the second application program to be installed in the second area may be identified to correspond to the first application program stored in the first area. The first application program of the Android version for executing a game A may be identified to correspond to the second application program for executing the game A of the Linux version having a common kernel with the Android.

When the first application program and the second application program are different versions of application programs for the same application program, it may be identified that the first application program stored in the first area corresponding to the first virtual machine and the second application program to be installed in the second area through the second virtual machine may not correspond to each other.

However, even if the first application program and the second application program are different versions of application programs for the same application program, when there is a difference only in a sub-version which causes a change in a subsidiary portion of the application programs of different versions, the first application program stored in the first area corresponding to the first virtual machine and the second application program to be installed in the second area through the second virtual machine may be identified to correspond to each other.

The first application program stored in the first area corresponding to the first virtual machine and the second application program to be installed in the second area through the second virtual machine may be identified to correspond to each other, if an application program may be an application program of the same version as the second application program by upgrading the first application program to a plugin or add-on type.

The shared area as described above may include a first shared area corresponding to the host operating system and a second shared area corresponding to a plurality of virtual machines.

When a user command to install a second application program corresponding to a first application program stored in a program area corresponding to a first virtual machine among a plurality of program areas is inputted, the processor 120 may transfer at least a part of the data relating to the first application program from a program area to a second shared area corresponding to the first virtual machine.

If a user command for installing a second application program corresponding to the first application program stored in the program area corresponding to the host operating system among the plurality of program areas is inputted, the processor 120 may transfer at least a part of the data relating to the first application program from the program area corresponding to the host operating system to the first shared area.

When the processor 120 transfers at least a part of the data relating to the first application program from the program area to the shared area, the user data among the data relating to first application program may be maintained in the first area.

More specifically, when a user command for installing a second application program corresponding to a first application program stored in a first area among a plurality of program areas is input to a second area of the plurality of program areas, the processor 120 may maintain user data relating to a user among the first application programs in the first area, and may transfer data other than the user data among the data relating to the first application programs from the first area to the shared area.

The user data refers to data relating to a user among data relating to an application program. In particular, in the disclosure, the user data may be used in the sense that collectively refers to data that does not need to be shared between the host operating system and the plurality of virtual machines. In the disclosure, data relating to an application moved to a shared area is shared between a host operating system and a plurality of virtual machines. However, it is general that the data relating to the user needs not be shared or should not be shared between the host operating system and the plurality of virtual machines.

For example, it is general that data relating to user environment setting of an application program and data generated by a user using an application program do not need to be shared between the host operating system and the plurality of virtual machines, and the data relating to the account information of the user should not be shared.

According to the disclosure, the user data may be used in the sense that collectively refers to data that does not need to be shared between the host operating system and the plurality of virtual machines, including the examples described above. The specific user data may vary depending on the type of the application program and the user's activity through the corresponding application program.

If at least a part of the data relating to the first application program is transferred to the shared area, the processor 120 may increase a reference count of the first application program.

When a user command for deleting the first application program from the first area is input, the processor 120 may delete the user data from the first area. If the user data is deleted according to a user command to delete the first application program from the first area, the processor 120 may reduce a reference count related to the first application program.

Here, the reference count is for applying a reference counting method, among the methods of managing the memory 110, and nay refer to a numerical value for identifying the number of virtual machines that refer to the corresponding application program. The reference count is related to the number of times the data relating to the first application program moves from the plurality of program areas to the shared area and the number of times the user data among the data relating to the first application program is deleted from the plurality of program areas.

When the first application program is installed in the plurality of program areas, the reference count of the first application program is 1. If the first application program is moved to a shared area from a plurality of program areas, the reference count of the first application program may be increased to 2. While the reference count of the first application program is increased to 2, when the user data of the data relating to the first application program is deleted from the plurality of program areas, the reference count of the first application program may be reduced to 1.

When a user command for deleting the first application program from the first area is input, the processor 120 may determine whether the first application program is to be deleted based on the reference count. Specifically, if the reference count is greater than zero, the processor 120 may maintain the data relating to the first application program in the shared area. If the reference count is 0, the processor 120 may delete the data relating to the first application program from the shared area.

In other words, if the reference count of the first application program is greater than zero, the electronic device 100 may maintain the data relating to the first application program in the shared area, since it means that the virtual machine referring to the first application program is present among the plurality of virtual machines. If the reference count of the first application program is zero (0), the electronic device 100 may delete the data relating to the first application program from the shared area because it may mean that there is no virtual machine referring to the first application program among the plurality of virtual machines.

As described above, the processor 120 may execute at least one instruction stored in the memory 110 and perform a control process according to the disclosure. In particular, the instructions related to the control process according to the disclosure may be implemented in software and stored in the memory 110, and the processor 120 may execute software stored in the memory 110 to perform a control process according to the disclosure.

Various embodiments according to the disclosure may be implemented through at least one of a code included in a host operating system, a code included in the guest operating system, a program installed in the host operating system, or a program installed in the guest operating system. The processor 120 may sequentially identify whether a control process according to the disclosure may be performed through the host operating system, the guest operating system, a program installed in a host operating system, a program installed in the guest operating system, and perform a control process according to the identification result.

For example, the processor 120 may identify whether a control process according to the disclosure may be performed through a code included in the guest operating system, if the process may not be performed by the code included in the guest operating code, identify whether the process may be performed through the code included in the host operating system, and may perform the control process according to the disclosure according to the code included in the guest operating system or the code included in the host operating system according to the identification result.

If it is identified that the control process according to the disclosure may not be performed through the code included in the guest operating system and the code included in the host operating system, the processor 120 may identify whether the process may be performed through the program installed in the guest operating system, and if the process may not be performed through the program installed in the guest operating system, the processor 120 may identify whether the process may be performed through a program installed in the host operating system, and may perform the control process according to the disclosure based on the program installed in the guest operating system or a program installed in the host operating system according to the identification result.

It has been described that at least a part of the data relating to the application program is transferred to the shared area corresponding to the plurality of virtual machines from the program area corresponding to any one of the plurality of virtual machines, but at least a part of the data relating to the application program may be transferred to a shared area corresponding to the host operating system from the program area corresponding to the host operating system. This embodiment will be described in detail with reference to FIGS. 6A and 6B.

A detailed configuration of the virtualization system according to the disclosure will be described in more detail with respect to a process in which at least a part of the data relating to the application program is transferred from the program area to the shared area, and at least a part of the data relating to the application program transferred to the shared area in the program area is deleted from the shared area.

Figure 3A:
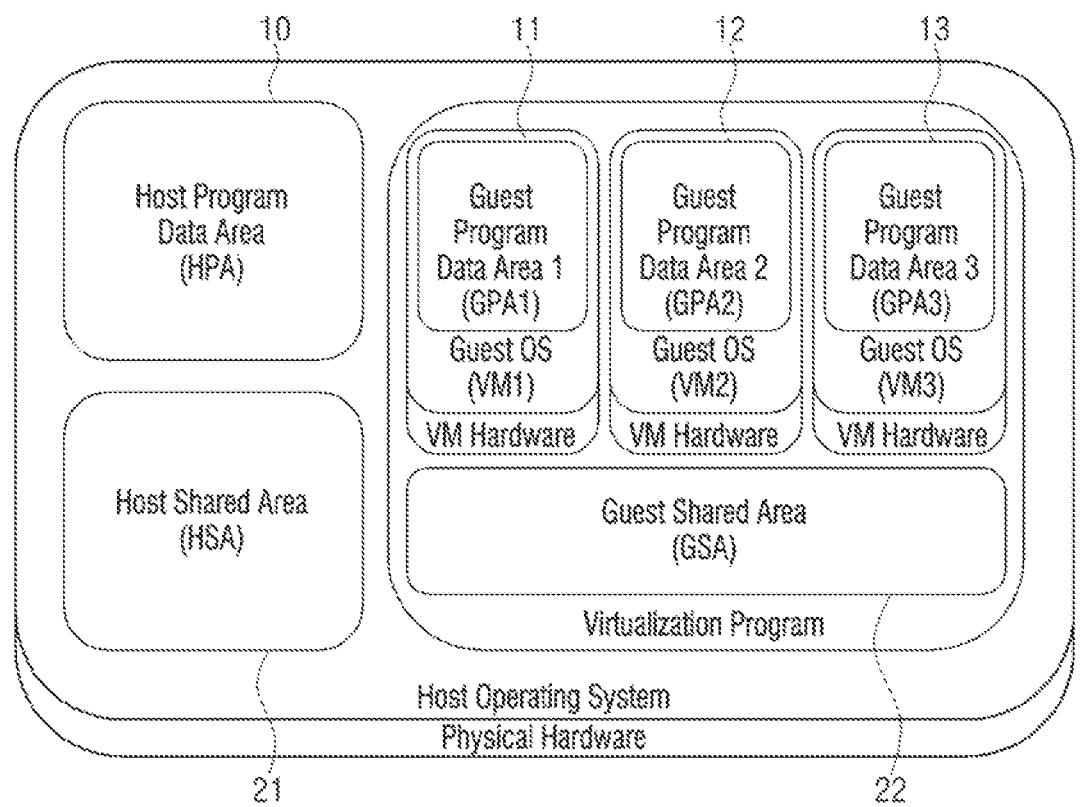
FIG. 3A is a diagram illustrating a configuration of a virtualization system according to an embodiment.
Figure 3B:
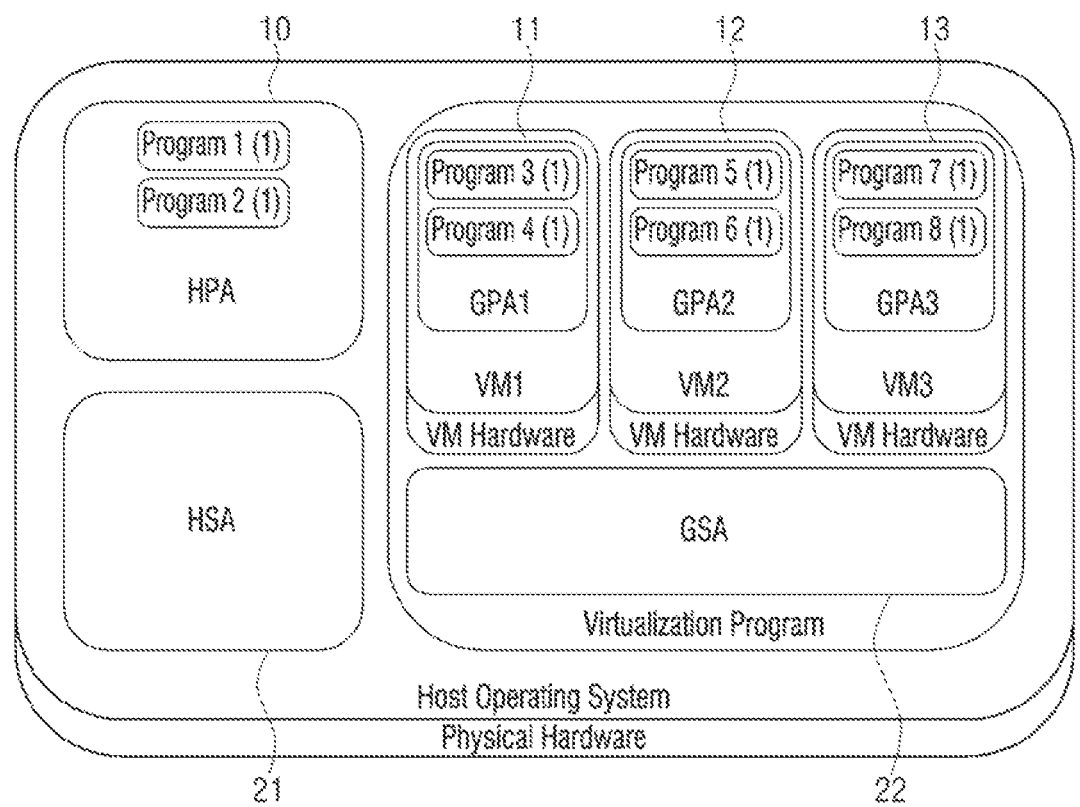
FIG. 3B is a diagram illustrating a state in which a plurality of application programs are installed in a plurality of areas included in a virtualization system according to an embodiment.

FIG. 3A is a diagram illustrating a configuration of a virtualization system according to an embodiment; and FIG. 3B is a diagram illustrating a state in which a plurality of application programs are installed in a plurality of areas included in a virtualization system according to an embodiment.

Referring to FIG. 3A, the virtualization system according to the disclosure may include a physical hardware, a host operating system (OS), a virtualization program, a plurality of virtual machines, and a guest operating system (OS).

The host operating system may provide a platform for managing physical hardware constituting the electronic device, and a platform for executing various application programs. The virtualization program may provide a hypervisor, which is a logical platform for simultaneously executing a plurality of operating systems in one hardware constituting the electronic device.

When a plurality of virtual machines are implemented on the host operating system through the virtualization program, each of the plurality of virtual machines may be allocated some resources of the physical hardware that constitutes the electronic device. If a plurality of guest operating systems corresponding to each of the plurality of virtual machines are installed, the electronic device may execute various application programs through the plurality of guest operating systems.

In detail, referring to FIG. 3A, on the first virtual machine, the second virtual machine, and the third virtual machine, a guest operating system (Guest-VM1), a guest operating system (Guest-VM2), and a guest operating system (Guest-VM3), respectively, may be installed.

The host operating system and the guest operating system according to the disclosure are not limited to a specific operating system. For example, when an electronic device according to the disclosure is implemented as a personal computer (PC), the host operating system and the guest operating system may be at least one of a Windows, a MAC OS, and Linux, respectively. When the electronic device according to the disclosure is implemented as a smartphone, the host operating system and the guest operating system may be at least one of the Android, iOS, or the Windows Mobile. When the electronic device according to the disclosure is implemented as a server, the host operating system and the guest operating system may be at least one of Linux, Unix, and Windows Server. In addition, the host operating system and the guest operating system according to the disclosure may be variously selected according to the type of the electronic device and the purpose e of use of the user.

As shown in FIG. 3A, the virtualization system according to the disclosure includes a plurality of program areas 10, 11, 12, 13 and shared areas 21, 22. The plurality of program areas 10, 11, 12, and 13 include a plurality of areas corresponding to the host operating system and the plurality of virtual machines, and the shared areas 21 and 22 correspond to the host operating system and the plurality of virtual machines.

Specifically, the virtualization system according to the disclosure may include a program area 10 corresponding to the host operating system (Host Program Data Area: HPA), a program area 11 corresponding to the first virtual machine (Gust Program Data Area 1: GPA 1), a second virtual Program area 12 corresponding to the machine (Gust Program Data Area 2: GPA 2) and a program area 13 corresponding to the third virtual machine (Gust Program Data Area 3: GPA 3).

The virtualization system according to the disclosure may include the shared areas 21 and 22 corresponding to both the host operating system and the plurality of virtual machines. The virtualization system according to the disclosure may include a first shared area 21 (Host Shard Area: HSA) corresponding to a host operating system, and a second shared area 22 (Guest Shared Area: GSA) corresponding to the plurality of virtual machines.

The plurality of program areas 10, 11, 12 and 13 and the shared areas 21 and 22 according to the disclosure may not mean a plurality of physically divided areas of the electronic device. The plurality of program areas 10, 11, 12, 13 and the shared area 21, 22 may mean a plurality of areas that are divided in an abstract manner as some resources of the physical hardware are assigned to each of the host operating system and the plurality of virtual machines. Accordingly, specifying the shared areas 21 and 22 by dividing the shared areas 21 and 22 into the first shared area 21 and the second shared area 22 is merely for describing the shared area 21 corresponding to the host operating system and the shared area 22 corresponding to the plurality of virtual machines in a clearly divided manner.

It has been described that the plurality of program areas 10, 11, 12, and 13 and the shared areas 21 and 22 according to the disclosure mean an area allocated to a memory, among physical hardware constituting the electronic device.

Hereinafter, referring to FIGS. 3B, 5A, 5B, 6A, 6B, 8A, and 8B, the program area 10 corresponding to the host operating system is referred to as the HPA, the program areas 11, 12, 13 corresponding to each of the plurality of virtual machines as GPA 1, GPA 2 and GPA 3, the shared area 21 corresponding to the host operating system to HAS, and the shared area 22 corresponding to a plurality of virtual machines to GHA.

In the state where the virtualization system as described above is implemented, a plurality of application programs may be installed in the plurality of program areas 10, 11, 12, and 13.

In detail, as shown in FIG. 3B, program 1 and program 2 may be installed in the program area 10 corresponding to the host operating system. Program 3 and program 4 may be installed in the program area 11 corresponding to the first virtual machine, program 5 and program 6 may be installed in the program area 12 corresponding to the second virtual machine, and program 7 and program 8 may be installed in the program area 13 corresponding to the third virtual machine.

Referring to FIG. 3B, a reference count of an application program is described with reference to FIG. 3B. The reference count is related to the number of times the data relating to the application program is moved from the plurality of program areas 10, 11, 12, and 13 to the shared areas 21 and 22, and the number of times the user data, among the data relating to the application program, is deleted from the plurality of program areas 10, 11, 12, and 13.

For example, when the first application program is installed in the plurality of program areas 10, 11, 12, and 13, the reference count of the first application program is 1.

When the first application program is moved from the plurality of program areas 10, 11, 12, and 13 to the shared areas 21 and 22, the reference count of the first application program may be increased to 2. While the reference count of the first application program is increased to 2, when the user data of the first application program is deleted from the plurality of program areas 10, 11, 12, and 13, the reference count of the first application program may be reduced to 1.

In the following description, a process in which at least a part of the data about the application programs is moved from the program areas 10, 11, 12, and 13 to the shared areas 21 and 22, and at least a part of the data about the application programs moved to the shared areas 21 and 22 from the program areas 10, 11, 12, and 13 is deleted from the shared area 21, 22 will be described in detail based on the virtual system implemented as described above.

Figure 4:
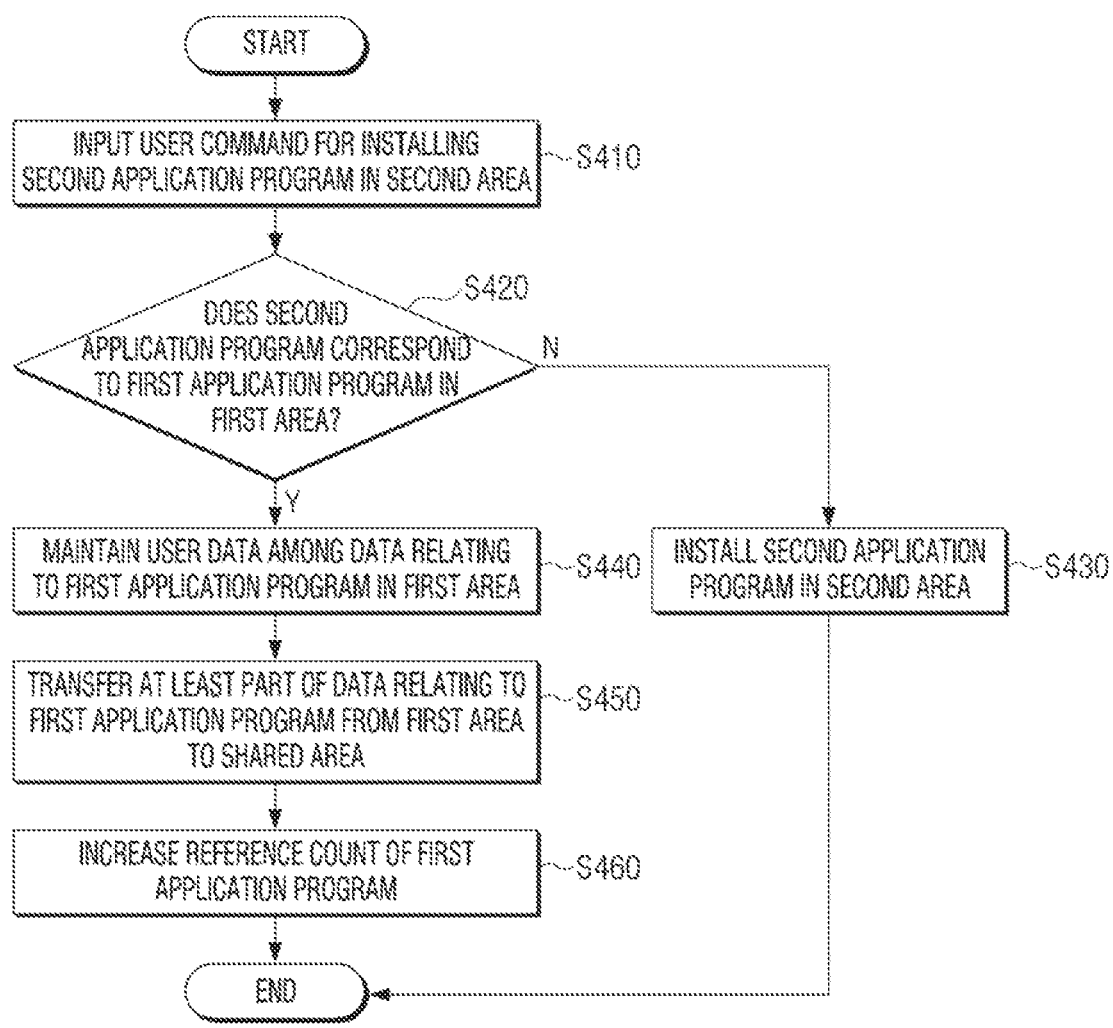
FIG. 4 is a flowchart illustrating a process in which at least a part of data relating to an application program is transferred from a program area to a shared area according to an embodiment.

FIG. 4 is a flowchart illustrating a process in which at least a part of data relating to an application program is moved to a shared area from a program area, according to an embodiment of the disclosure. FIGS. 5A to 6B are diagrams illustrating a process in which at least a part of the data relating to the application program is moved to the shared area from the program area, according to an embodiment of the disclosure.

The electronic device may receive a user command to install the second application program in a second area among a plurality of program areas 10, 11, 12, 13 in operation S410.

Figure 5A:
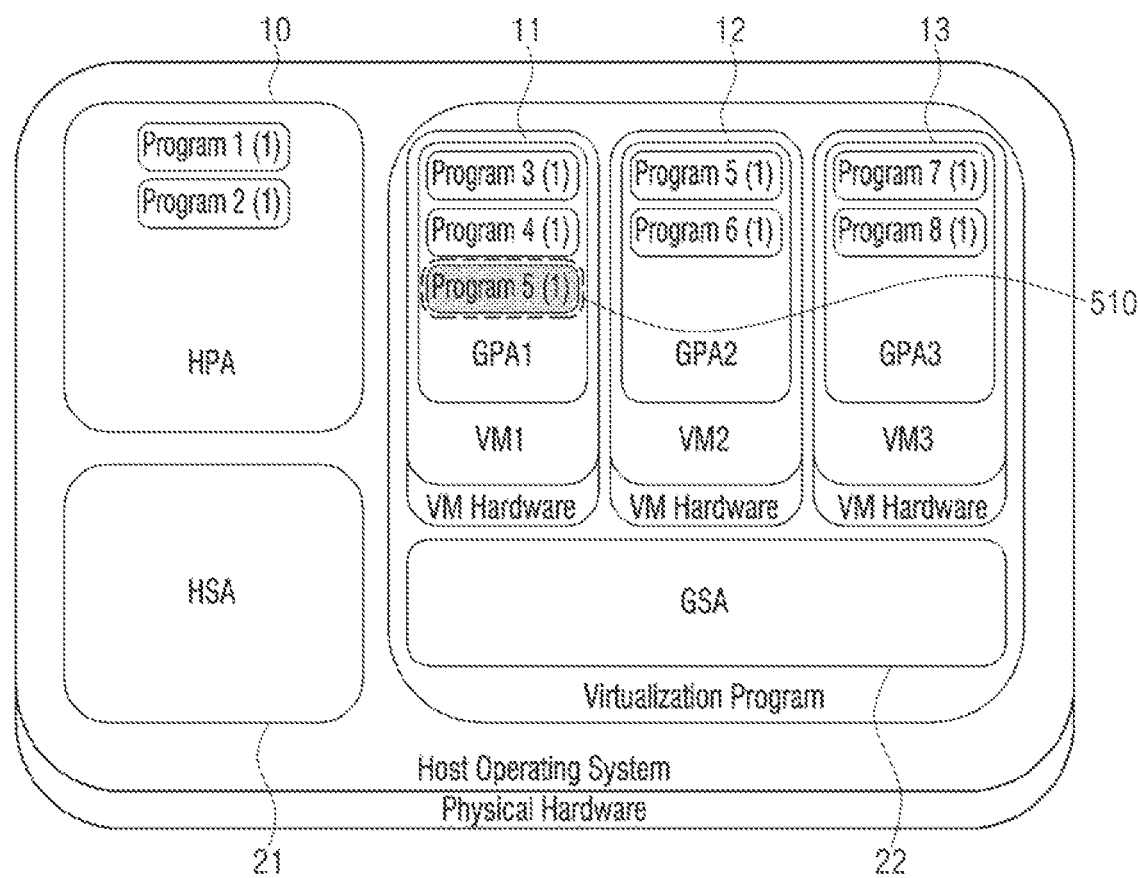
FIGS. 5A, 5B, 6A and 6B are diagrams illustrating a process in which at least a part of the data relating to an application program is transferred from a program area to a shared area according to an embodiment.

For example, as shown in FIG. 5A, the electronic device may receive a user command for installing the program 5 to the GTA 1 11 among the plurality of program areas 10, 11, 12, 13. As shown in FIG. 5A, the program 5 510 indicates that a user command for installing the program 5 to the GTA 1 11 among the plurality of program areas 10, 11, 12, and 13 has been received.

Figure 6A:
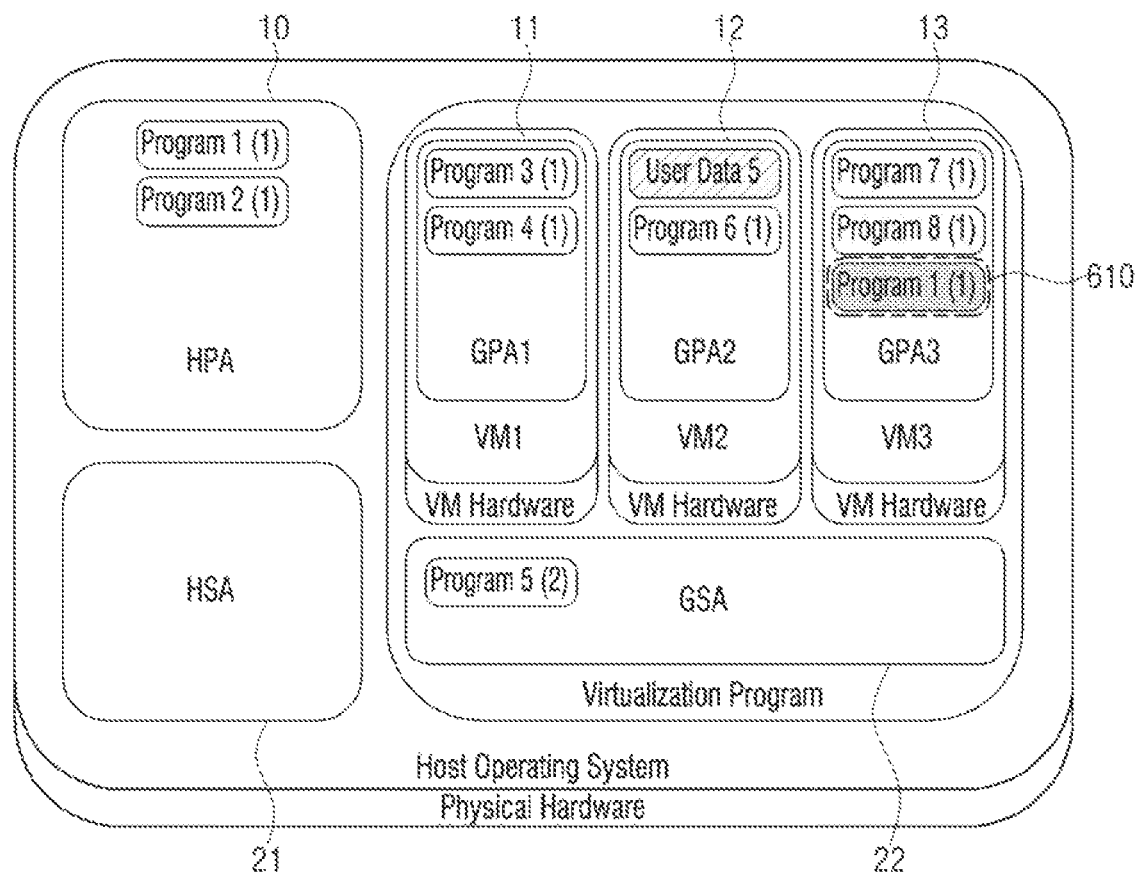

As shown in FIG. 6A, the electronic device may receive a user command for installing the program 1 at the GTA 3 13 among the plurality of program areas 10, 11, 12, and 13. As shown in FIG. 5A, the program 1 610 indicates that a user command for installing program 1 to GTA 3 13 among a plurality of program areas 10, 11, 12, and 13 has been received.

When a user command for installing the second application program in the second area is input, the electronic device may identify whether the second application program corresponds to the first application program stored in the first area in operation S420.

If a user command for installing the second application program in the second area is input, the electronic device may identify a first application program corresponding to a second application program among application programs installed in the remaining program area except for the second area.

If the second application program does not correspond to the first application program in operation S420-N, the electronic device may install the second application program in the second area in operation S430. If the first application program corresponding to the second application program is not present among the application programs installed in the remaining program area except for the second area, the electronic device may install the second application program in the second area.

If the second application program corresponds to the first application program in operation S420-Y, the electronic device may maintain the user data among the data relating to the first application program in the first area in operation S440, and may transfer at least a part of the data relating to the first application program from the first area to the shared area 21 and 22 in operation S450.

If there is a first application program corresponding to a second application program among application programs installed in the remaining program area except for the second area, the electronic device may maintain the user data in the program area where the first application program exists, and may transfer the data other than the user data to the shared area 21 and 22, among the data relating to the first application program.

Figure 5B:
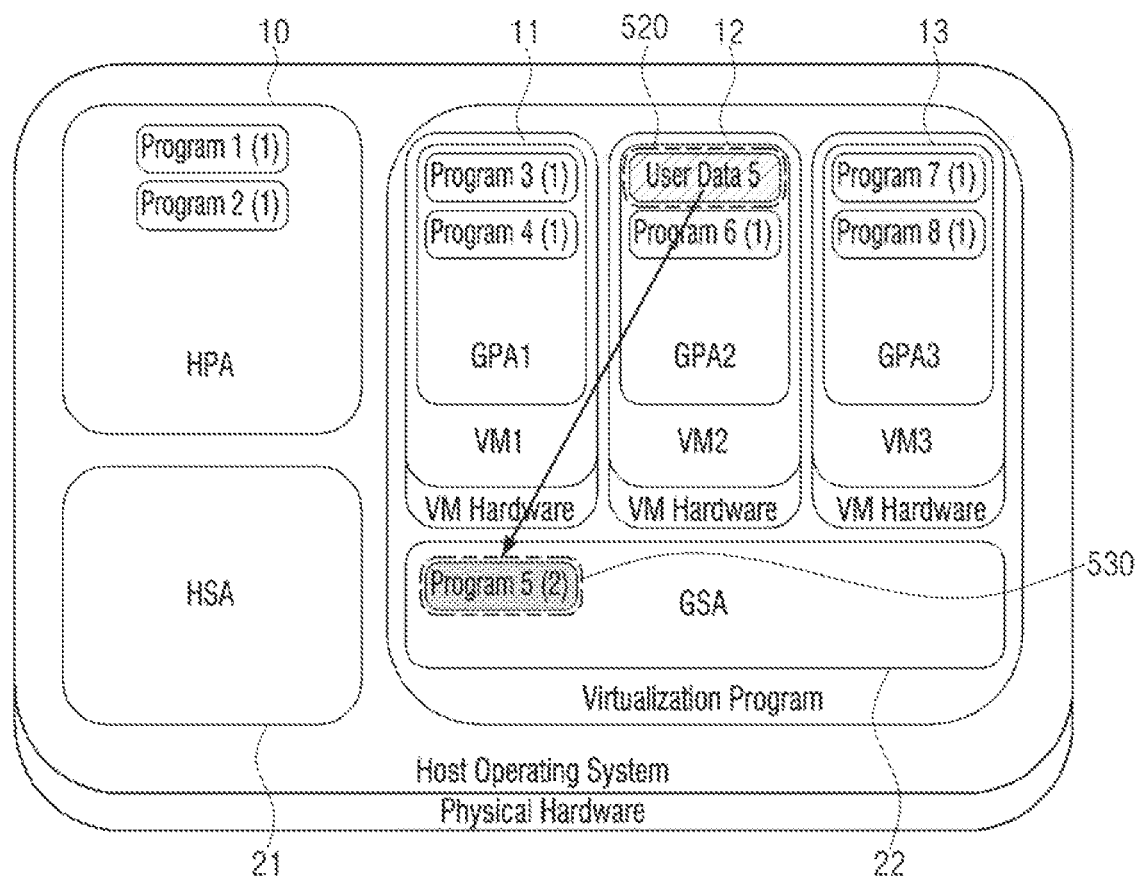

As shown in FIG. 5B, the user data 5 520 indicates that the user data is maintained in the program area 12 in which the first application program exists, and the program 5 530 as shown in FIG. 5B is to indicate that data other than the user data is moved to the second shared area 22.

Figure 6B:
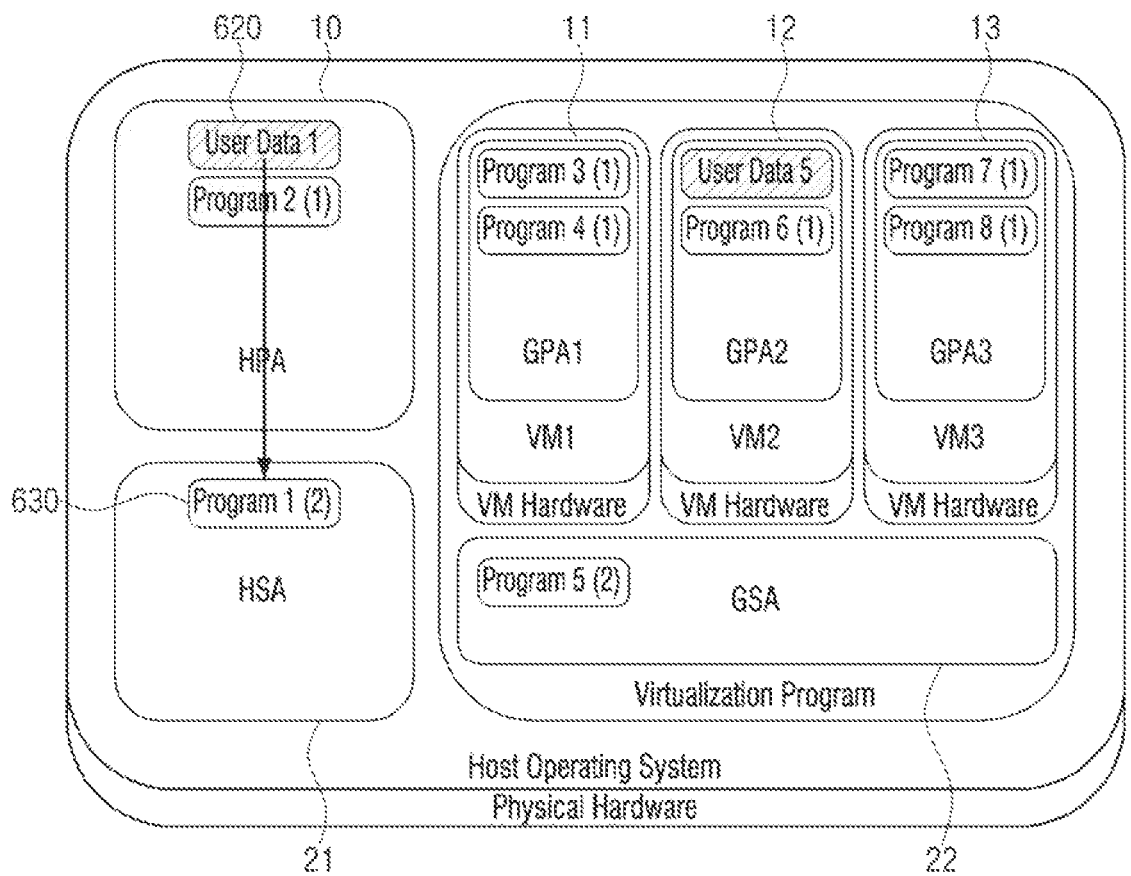

As illustrated in FIG. 6B, the user data 1 620 is to indicate that the user data is maintained in the program area 10 where the first application program exists, and the program 1 630 as shown in FIG. 6B is to indicate that data other than the user data is moved to the first shared area 21.

When at least a part of the data relating to the first application program is transferred from the first area to the shared area 21, 22, the electronic device may increase the reference count of the first application program in operation S460.

As shown in FIG. 5B, the reference count 2 of the program 5 530, as shown in FIG. 5B, is to indicate that at least a part of the data relating to the first application program is moved from the GTA 2 12 of the plurality of program areas 10, 11, 12, and 13 to the second shared area 22, so that the reference count of the first application program is increased from 1 to 2.

As shown in FIG. 6B, the reference count 2 of the program 1 630 is to indicate that at least a part of the data relating to the first application program is moved from among the plurality of program areas 10, 11, 12, and 13 to the first shared area 21 from the HPA 10, the reference count of the first application program is increased from 1 to 2.

It has been described that at least a part of the data relating to the application program is transferred from the program area to the shared area, and it will be described that at least a part of the data about the application program transferred to the shared area from the program area is deleted from the shared area.

Figure 8A:
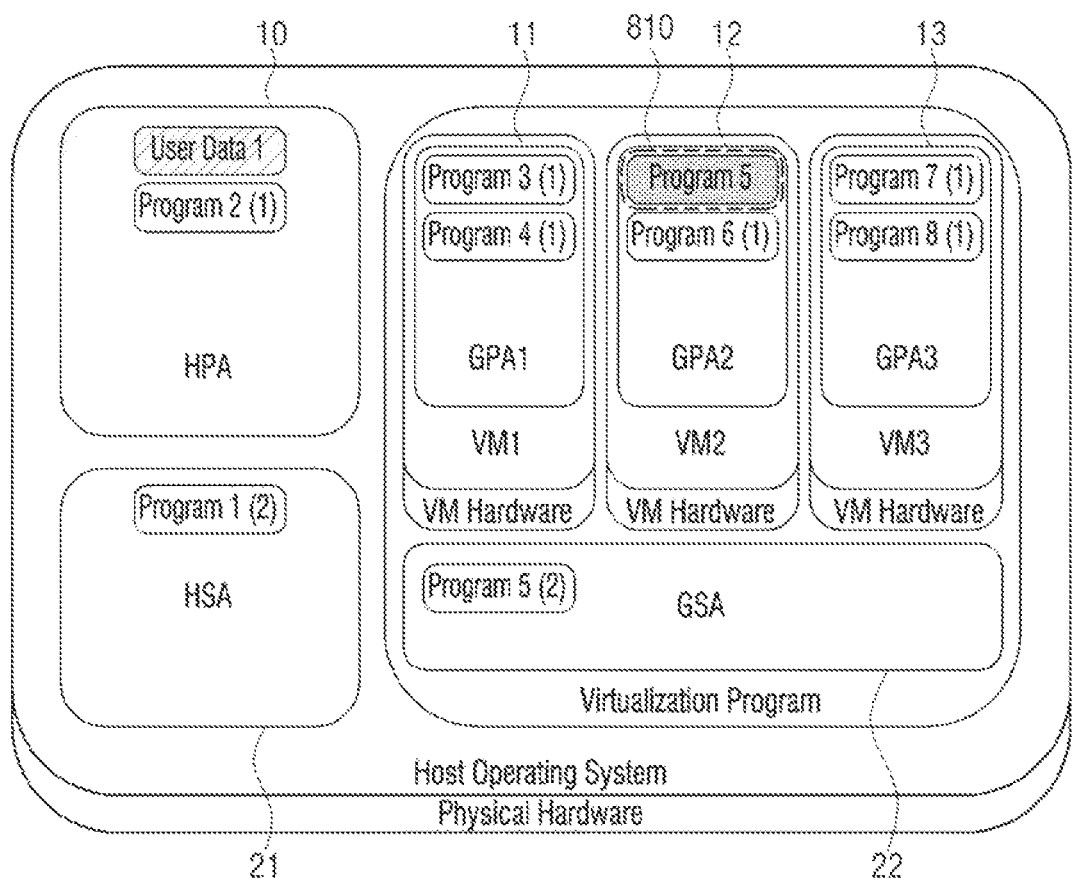
FIGS. 8A and 8B are diagrams illustrating a process in which at least a part of the data relating to the application program transferred from a program area to a shared area is deleted from the shared area in detail.
Figure 8B:
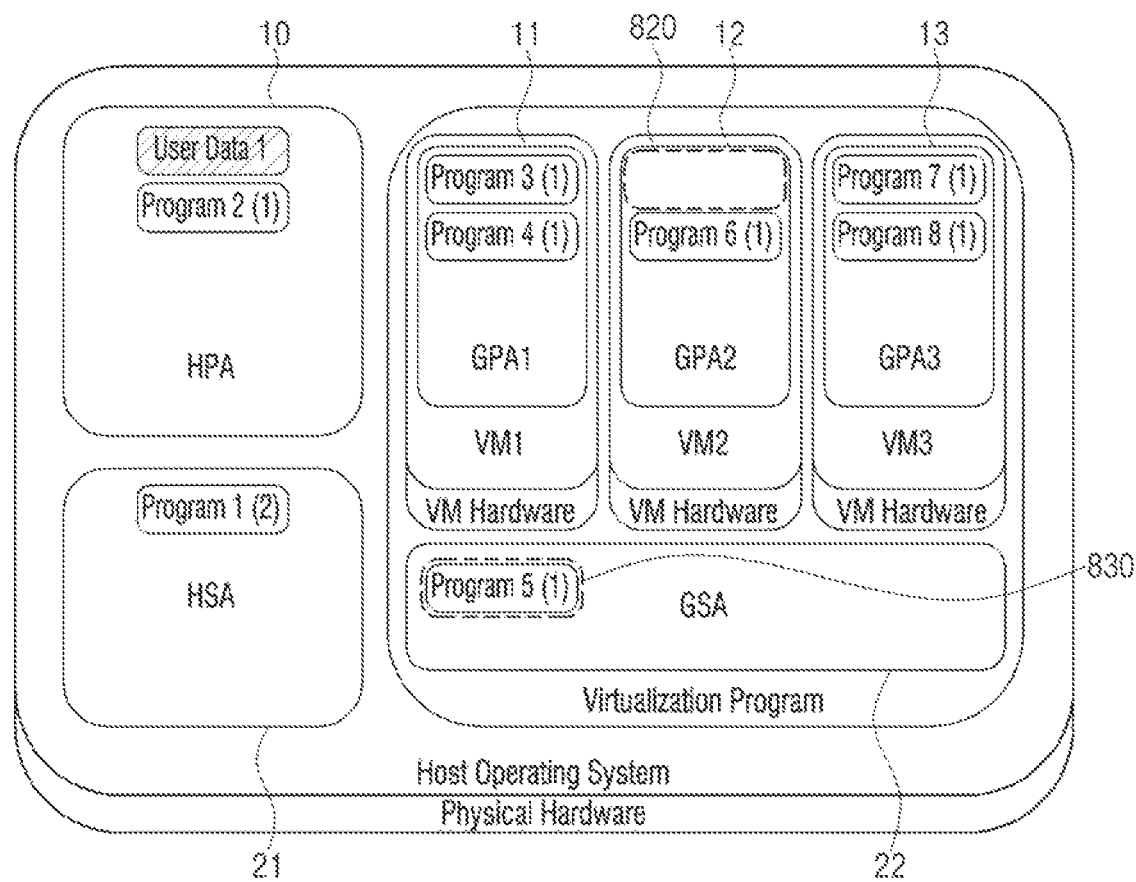

FIG. 7 is a flowchart illustrating a process in which at least a part of data relating to an application program moved to a shared area from a program area is deleted from a shared area, according to an embodiment of the disclosure. FIGS. 8A and 8B are diagrams illustrating a process in which at least a part of data relating to an application program transferred to a shared area from a program area is deleted from the shared area.

An embodiment will be described in which, when the first application program is moved from the first area of the plurality of program areas 10, 11, 12, and 13 to the shared areas 21 and 22, the first application program is deleted from the first area through the first virtual machine corresponding to the first area.

If the first application program has not been transferred from the first area to the shared areas 21 and 22, it means that a command for installing the first application program in the remaining program area is not received except for the first area among the plurality of program areas 10, 11, 12, and 13. This means that the first application program is not referenced in the remaining program area except for the first area, it does not need to determine whether to delete in consideration of the reference count of the first application program.

The electronic device may receive a user command for deleting the first application program in the first area among the plurality of program areas 10, 11, 12, and 13 in operation S710.

For example, as shown in FIG. 8A, the electronic device may receive a user command to delete program 5 from GTA 2 12 among the plurality of program areas 10, 11, 12, 13. As shown in FIG. 8A, program 5 810 indicates that a user command for deleting program 5 from GTA 3 13 among a plurality of program areas 10, 11, 12, 13 has been received.

When a user command for deleting the first application program from the first area is input, the electronic device may delete the user data from the first area in operation S720.

For example, when a user command to delete the first application program from the first area is input w % bile the data except the user data among the data relating to the first application program is transferred to the shared areas 21, 22 and user data is maintained in the first area, the electronic device may delete the user data among the data relating to the first application program from the first area.

A blank 820, as shown in FIG. 8B, is for indicating that the user data among the data relating to the first application program has been deleted from the GTA 2 12 among the plurality of program areas 10, 11, 12, and 13.

If user data among the data relating to the first application program is deleted from the first area, the electronic device may reduce the reference count of the first application program in operation S730.

As shown in FIG. 8B, the reference count 1 of the program 5 830 is to indicate that the reference count of the first application program is reduced from 2 to 1 as the user data among the data relating to the first application program is deleted from the GTA 2 12 among the plurality of program areas 10, 11, 12, and 13.

When a user command for deleting the first application program from the first area is input, the electronic device may determine whether to delete the first application program based on the reference value of the first application program in operation S740.

When a user command for deleting the first application program from the first area is input, as described above, the electronic device may delete only the user data among the first application program from the first area, and determine whether to delete the remaining data except the user data according to a process as described below.

If the reference value of the first application program is not zero, that is, if the reference value of the first application program is greater than zero in operation S740-N, the electronic device may maintain the data relating to the first application program in the shared area 21, 22 in operation S750.

If the reference count of the first application program is greater than zero, it means that the virtual machine referring to the first application program among the plurality of virtual machines is present, the electronic device may maintain the data relating to the first application program in the shared area 21, 22.

For example, if the reference count of program 5 830 is 1 as shown in FIG. 8B, it means that there is one virtual machine referring to program 5 among the plurality of virtual machines, the electronic device may maintain the data relating to the first application program in the shared area 21, 22.

If the reference count of the first application program is 0 in operation S740-Y, the electronic device may delete the data relating to the first application program from the shared area 21, 22 in operation S760.

If the reference count of the first application program is 0, it means that there is no virtual machine referring to the first application program among the plurality of virtual machines, and the electronic device may delete the first application program from the shared area 21 and 22.

According to various embodiments of the disclosure as described above, in an electronic device in which a virtualization system including a plurality of virtual machines is implemented, an application program corresponding to each other may be prevented from being installed in a duplicated manner in a plurality of program areas corresponding to each of a plurality of virtual machines, thereby preventing unnecessary waste of resources.

When the data relating to the application program is transferred from the program area to the shared area, the user data may be maintained in the program area, and when the application program is deleted, whether to delete the application program is determined based on the number of the virtual machines referring to the application program, thereby efficiency of the memory management may be further maximized.

According to the disclosure, the efficiency of memory usage may be maximized in an electronic device in which a virtualization system including a plurality of virtual machines is implemented, and utilization of the plurality of virtual machines may be significantly increased. In addition, as the number of virtual machines included in the virtualization system increases, the greater the number of virtual machines included in the virtualization system would be.

Figure 9:
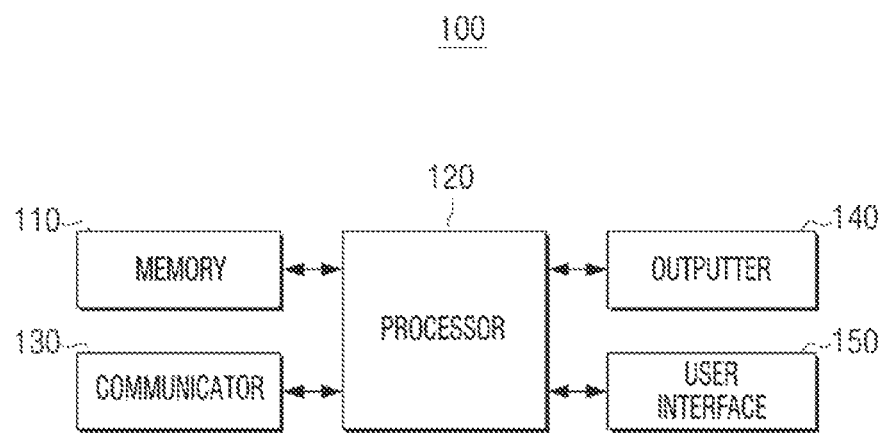
FIG. 9 is a block diagram illustrating a configuration of an electronic device in detail according to an embodiment.

FIG. 9 is a block diagram illustrating a configuration of an electronic device in detail according to an embodiment.

As illustrated in FIG. 2, the electronic device 100 according to an embodiment may include the memory 110 and the processor 120. As illustrated in FIG. 9, the electronic device 100 according to an embodiment may further include the memory 110 and the processor 120, and may further include a communicator 130, an outputter 140 and a user interface 150.

This configuration is merely exemplary, and in various embodiments, one or more components may be added or omitted.

The communicator 130 may communicate with an external electronic device (not shown) or a server (not shown). The communicator 130 may include at least one of a Wi-Fi chip, a Bluetooth chip, a wireless communication chip, and a near field communication (NFC) chip.

The Wi-Fi chip and the Bluetooth chip, respectively, may communicate by a Wi-Fi method and a Bluetooth method. When using the Wi-Fi chip or the Bluetooth chip, various connection information such as service set identifier (SSID) may be transmitted and received for communication connection and then various information may be transmitted and received.

The wireless communication module may communicate according to various communication specifications such as IEEE, Zigbee, $3^{rd}$ generation (3G), $3^{rd}$ generation partnership project (3GPP), long term evolution (LTE), $5^{th}$ generation (5G), or the like. The NFC module 114 may communicate by the NFC method using a 13.56 MHz band among various RF-ID frequency bands such as 135 kHz, 13.56 MHz, 433 MHz, 860~960 MHz. 2.45 GHz, or the like.

In particular, in various embodiments of the disclosure, the communicator 130 may receive a virtualization program, a guest operating system, or an application program through an external electronic device (not shown) or a server (not shown). The processor 120 may store the received virtualization program, the guest operating system, or the application program in the memory 110.

The outputter 140 may output various functions that the electronic device 100 may perform. The outputter 140 may include at least one of a display, a speaker, and an indicator. The display may output image data under the control of the processor 120.

According to various embodiments of the disclosure, the processor 120 may control the display to provide a user interface (UI) for managing the electronic device 100 via the host operating system and the guest operating system. The processor 120 may control the display to provide a user interface for managing the virtualization system in accordance with the disclosure. The processor 120 may control the outputter 140 to output various functions according to the execution of the application program.

The user interface 150 receives a user command for controlling the overall operation of the electronic device 100. Specifically, the user interface 150 may include a camera, a microphone, a remote control signal receiver, or the like. The user interface unit 150 may be implemented as a touch screen in a form included in the display.

When the electronic device 100 according to the disclosure is implemented as a personal computer (PC), the user interface 150 may include a mouse and a keyboard. A user command for installing an application program according to the disclosure and a user command for deleting an application program may be input through a mouse and a keyboard.

When the electronic device 100 according to the disclosure is implemented as a mobile phone, the user interface 150 may include a touch screen and a microphone. The user command for installing an application program according to the disclosure and a user command for deleting an application program may be input through a touch screen and a microphone.

Figure 10:
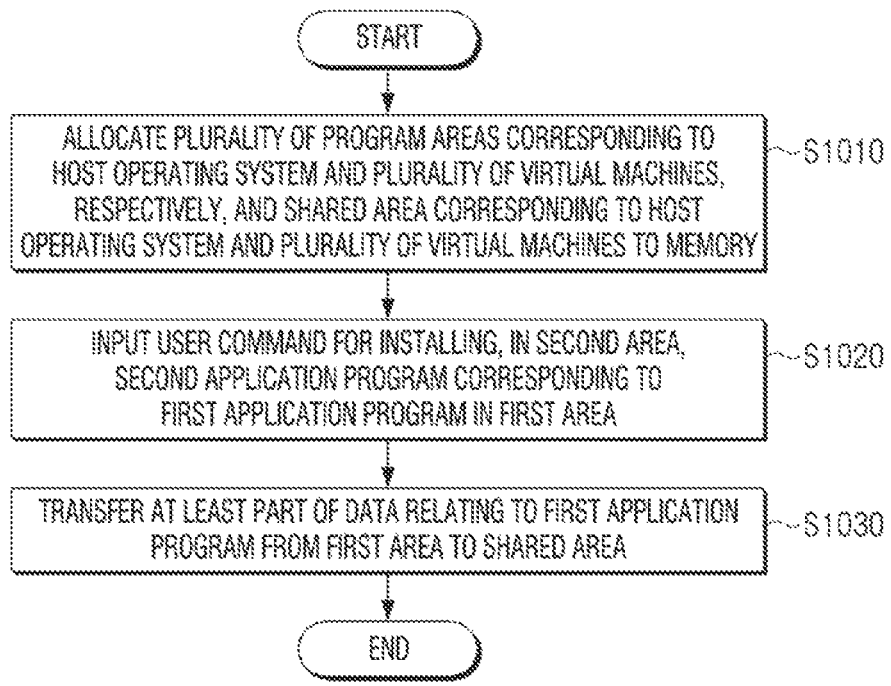
FIG. 10 is a flowchart illustrating a method of controlling an electronic device according to an embodiment.

FIG. 10 is a flowchart illustrating a method of controlling an electronic device according to an embodiment.

As shown in FIG. 10, according to a controlling method of the electronic device according to an embodiment, the electronic device may allocate a plurality of program areas corresponding to the host operating system and the plurality of virtual machines, respectively, and the shared area corresponding to the host operating system and the plurality of virtual machines to the memory in operation S1010.

When a virtualization system according to the disclosure is implemented, the electronic device may allocate a program area corresponding to the host operating system, a program area corresponding to the first virtual machine, and a program area corresponding to the second virtual machine to the memory. The electronic device may allocate a shared area corresponding to both the host operating system and the plurality of virtual machines to the memory.

When the plurality of program areas and the shared area are allocated to the memory, the electronic device may receive a user command for installing a second application program corresponding to the first application program stored in the first area in the second area in operation S1020.

Specifically, the electronic device may receive a user command for installing a second application program in a second area of the plurality of program areas through a second virtual machine among the plurality of virtual machines.

When a user command for installing the second application program in the second area is received, the electronic device transfers at least a part of the data relating to the first application program from the first area to the shared area in operation S1030.

That the first application program corresponds to the second application program may include not only an example where the first application program is the same as the second application program but also an example where at least a part of the data relating to the first application program is the same as the data about the second application program. The specific meaning that the first application program corresponds to the second application program has been described in detail in the description of FIG. 2, and thus a duplicate description thereof will be omitted.

In addition to the above-described embodiments as described above, various embodiments of the electronic device as described above in FIGS. 1-9 may be implemented in the same manner as in the control method of the electronic device according to the disclosure.

According to an embodiment described above, the method for controlling an electronic device may be implemented as a program and provided to the electronic device. A program including a method for controlling an electronic device may be stored in a non-transitory computer-readable medium and provided.

A computer-readable recordable medium including a program for executing a control method of the electronic device includes the steps of allocating a plurality of program areas corresponding to the host operating system and a plurality of virtual machines, respectively, and a shared area corresponding to the host operating system and the plurality of virtual machines to a memory included in the electronic device; and transferring at least a part of the data relating to the first application program from the first area to the shared area based on a user command for installing a second application program corresponding to the first application program stored in the first area to the second area among the plurality of program areas being input.

The non-transitory computer-readable medium does not refer to a medium that stores data for a short period of time, such as a register, cache, memory, etc., but semi-permanently stores data and is available of reading by the device. Specifically, programs of performing the above-described various methods can be stored in a non-transitory computer readable medium such as a CD, a DVD, a hard disk, a Blu-ray disk, universal serial bus (USB), a memory card, ROM, or the like, and can be provided.

Figure 11:
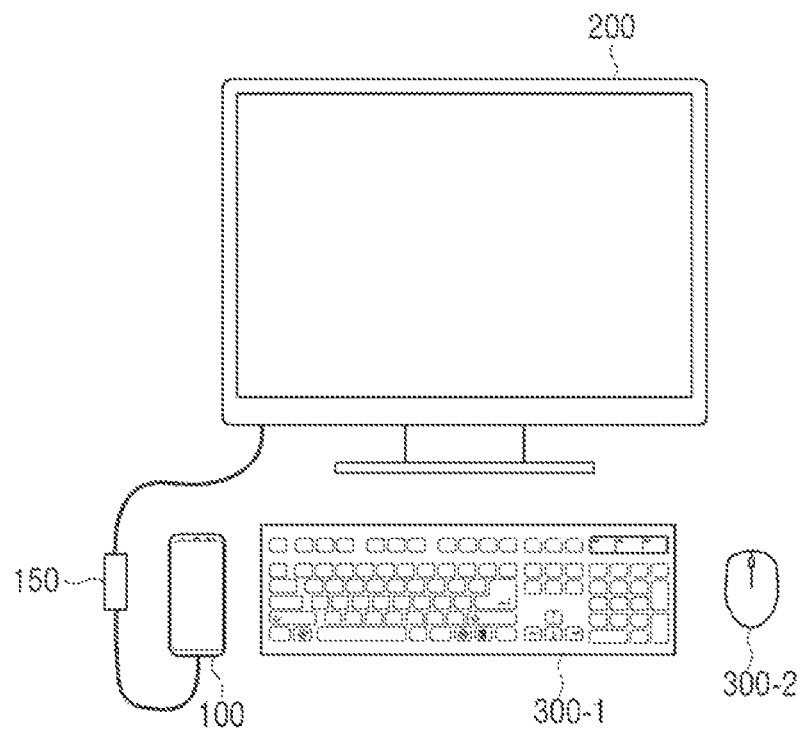
FIG. 11 is a diagram illustrating an embodiment of a case where an electronic device according to the disclosure establishes a communication connection with a display device and executes a guest operating system accordingly.

FIG. 11 is a diagram illustrating an embodiment of a case where the electronic device 100 according to the disclosure establishes a communication connection with the display device 200 and executes a guest operating system accordingly.

The electronic device 100 according to the disclosure may establish a communication connection with the display device 200. For example, as shown in FIG. 11, the electronic device 100 may establish a communication connection with the display device 200 via the HDMI adapter 150 and the cable. In addition, the electronic device 100 may establish a communication connection with a preset input device 300-1 and 300-2 including a keyboard and a mouse through near-field wireless communication, and may input a user command through the input devices 300-1 and 300-2 when a communication connection with the preset input devices 300-1 and 300-2 is established.

When a communication connection with the display device 200 is established, the electronic device 100 may execute the guest operating system through the virtual machine and provide a user interface according to the guest operating system through the display device 200. For example, when Android is installed as a host operating system in the electronic device 100, if communication connection is established between the electronic device 100 and the display device 200, the electronic device 100 may execute Linux, which is the guest operating system through the virtual machine, and provide a user interface according to the Linux through the display device 200.

When the user interface according to the guest operating system is provided through the display device 200, the electronic device 100 may install the application program on the guest operating system based on the user command inputted through the electronic device 100 or external input devices 300-1 and 300-2, and execute or delete the installed application program. When the electronic device 100 establishes communication connection with the display device 200 and thus executes the guest operating system through the virtual machine, the disclosure may be applied to the installation, execution, and deletion of the application program on the guest operating system.

As described above, the electronic device 100 according to an embodiment may assign a first area corresponding to a host operating system among a plurality of program areas and a second area corresponding to a virtual machine among the plurality of program areas to the memory of the electronic device 100. The electronic device 100 may allocate the shared area corresponding to both the host operating system and the plurality of virtual machines to the memory of the electronic device 100.

When a user command for installing the second application program in the second area is input, the electronic device 100 may identify whether the second application program corresponds to the first application program stored in the first area. In the above example, when a user command for installing the second application program in the second area is input through the user interface according to the Linux, the electronic device 100 may identify whether the second application program corresponds to the first application program stored in the first area.

If a user command for installing the second application program of the Linux format for executing the game A is input to the second area, the electronic device 100 may identify whether the second application program corresponds to the first application program stored in the first area. In this example, if the first application program stored in the first area is an application program of the Android version for executing the game A, the first application program of the Android version for executing the same game A may be identified as corresponding to a second application program of a Linux version which uses kernel in common with the Android.

When the first application program and the second application program correspond to each other, the electronic device 100 may maintain user data among the data relating to the first application program in the first area, and may transfer at least a part of the data relating to the first application program from the first area to the shared area. When at least a part of the data relating to the first application program is transferred from the first area to the shared area, the electronic device 100 may execute the first application program through the virtual machine and the guest operating system based on the data relating to the first application program transferred to the shared area.

Although the embodiments of the disclosure relating to the installation of an application program are described above with reference to FIGS. 1 to 10, various embodiments as described above may be applied even when the electronic device 100 establishes a communication connection with the display device 200 and thus the guest operating system is executed through the virtual machine.

According to various embodiments of the disclosure as described above, in an electronic device in which a virtualization system including a plurality of virtual machines is implemented, application programs corresponding to each other may be prevented from being installed in a duplicate manner in a plurality of program areas corresponding to each of a plurality of virtual machines, thereby preventing unnecessary waste of resources.

When the data relating to the application program is transferred from the program area to the shared area, the user data may be maintained in the program area, and when the application program is deleted, the efficiency of the memory management may be further maximized by determining whether the application program is deleted based on the number of the virtual machines referring to the application program.

As a result, according to the disclosure, the efficiency of memory usage may be maximized in an electronic device in which a virtualization system including a plurality of virtual machines is implemented, thereby significantly increasing the utilization of a plurality of virtual machines. As the number of virtual machines included in the virtualization system increases, the greater the number of virtual machines included in the virtualization system would be.

While preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic device comprising:
a memory to store at least one instruction; and
a processor to execute the at least one instruction stored in the memory to control the electronic device,
wherein the processor is further configured to:
allocate a plurality of program areas corresponding to a host operating system and a plurality of virtual machines to the memory and allocate a shared area corresponding to the host operating system and the plurality of virtual machines to the memory, and
based on a request to install a second application program in a second area among the plurality of program areas, identify whether the second application program corresponds to a first application program stored in a first area among the plurality of program areas,
based on the second application program corresponding to the first application program, maintain user data regarding a user in the first area of the plurality of program areas, and move data other than the user data regarding the first application program from the first area of the plurality of program areas to the shared area, and
based on the second application program not being corresponding to the first application program, install the second application program in the second area.

2. The electronic device of claim 1, wherein the shared area comprises a first shared area corresponding to the host operating system and a second shared area corresponding to the plurality of virtual machines, and
wherein the processor is further configured to,
based on the request to install the second application program being to the second area which is a program area corresponding to a second virtual machine among the plurality of program areas and the first application program is stored in the first area which is a program area corresponding to a first virtual machine among the plurality of program areas, transfer at least a part of the data relating to the first application program from the program area corresponding to the first virtual machine to the second shared area.

3. The electronic device of claim 1, wherein the shared area comprises a first shared area corresponding to the host operating system and a second shared area corresponding to the plurality of virtual machines,
wherein the processor is further configured to,
provided the request to install the second application program is to the second area which is a program area corresponding to a second virtual machine among the plurality of program areas, and the first application program is stored in the first area which is a program area corresponding to a host operating system among the plurality of program areas, transfer at least a part of the data relating to the first application program from a program area corresponding to the host operating system to the first shared area.

4. The electronic device of claim 1, wherein the processor is further configured to,
based on at least a part of the data relating to the first application program being transferred to the shared area, increase a reference count relating to a number of times when the at least the part of the data relating to the first application program is transferred from the plurality of program areas to the shared area and a number of times when the user data among the at least the part of the data relating to the first application program is deleted from the plurality of program areas.

5. The electronic device of claim 4, wherein the processor is further configured to, based on a request to delete the first application program from the first area, delete the user data from the first area, and based on the user data being deleted, reduce the reference count.

6. The electronic device of claim 5, wherein the processor is further configured to, based on the request to delete the first application program from the first area, determine whether to delete the first application program based on the reference count.

7. The electronic device of claim 6, wherein the processor is further configured to, based on the reference count being greater than zero, maintain data relating to the first application program in the shared area, and
based on the reference count being zero, delete the data relating to the first application program from the shared area.

8. A method of controlling an electronic device, the method comprising:
allocating a plurality of program areas corresponding to a host operating system and a plurality of virtual machines to a memory of the electronic device and allocating a shared area corresponding to the host operating system and the plurality of virtual machines to the memory of the electronic device;
based on a request to install a second application program in a second area among the plurality of program areas, identifying whether the second application program corresponds to a first application program stored in a first area among the plurality of program areas;
based on the second application program corresponding to the first application program, maintaining user data regarding a user in the first area of the plurality of program areas, and moving data other than the user data regarding the first application program from the first area of the plurality of program areas to the shared area; and
based on the second application program not being corresponding to the first application program, installing the second application program in the second area.

9. The method of claim 8, wherein the shared area comprises a first shared area corresponding to the host operating system and a second shared area corresponding to the plurality of virtual machines, and,
wherein based on the request to install the second application program being to the second area which is a program area corresponding to a second virtual machine among the plurality of program areas and the first application program is stored in the first area which is a program area corresponding to a first virtual machine among the plurality of program areas, transferring at least a part of the data relating to the first application program from the program area corresponding to the first virtual machine to the second shared area.

10. The method of claim 8, wherein the shared area comprises a first shared area corresponding to the host operating system and a second shared area corresponding to the plurality of virtual machines,
wherein based on the request to install the second application program being to the second area which is a program area corresponding to a second virtual machine among the plurality of program areas, and the first application program is stored in the first area which is a program area corresponding to a host operating system among the plurality of program areas, transferring at least a part of the data relating to the first application program from the program area corresponding to the host operating system to the first shared area.

11. The method of claim 8, further comprising:
based on at least a part of the data relating to the first application program being transferred to the shared area, increasing a reference count relating to a number of times when the at least the part of the data relating to the first application program is transferred from the plurality of program areas to the shared area and a number of times when the user data among the at least the part of the data relating to the first application program is deleted from the plurality of program areas.

12. The method of claim 11, further comprising:
based on a request to delete the first application program from the first area, deleting the user data from the first area; and
based on the user data being deleted, reducing the reference count.

13. A non-transitory computer-readable recording medium including a program to execute a method for controlling an electronic device, the method comprising:

allocating a plurality of program areas corresponding to a host operating system and a plurality of virtual machines to a memory of the electronic device and allocating a shared area corresponding to the host operating system and the plurality of virtual machines to the memory of the electronic device;

based on a request to install a second application program in a second area among the plurality of program areas identifying whether the second application program corresponds to a first application program stored in a first area among the plurality of program areas;

based on the second application program corresponding to the first application program, maintaining user data regarding a user in the first area of the plurality of program areas, and moving data other than the user data regarding the first application program from the first area of the plurality of program areas to the shared area; and based on the second application program not being corresponding to the first application program, installing the second application program in the second area.

* * * * *